ns patent office

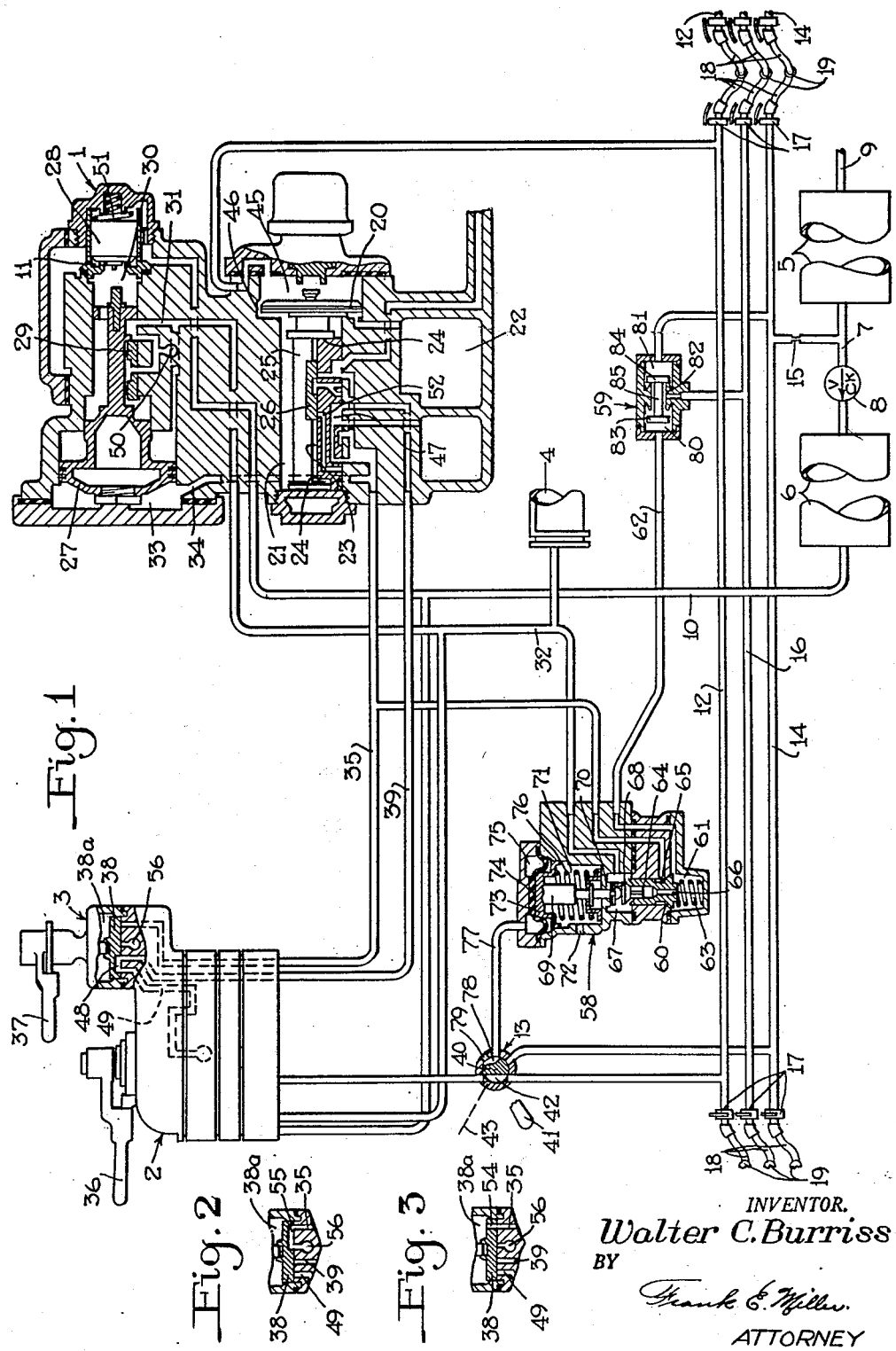

2,699,972
Patented Jan. 18, 1955

2,699,972

FLUID PRESSURE BRAKE EQUIPMENT

Walter C. Burriss, Turtle Creek, Pa., assignor to Westinghouse Air Brake Company, a corporation of Pennsylvania Application April 26, 1951, Serial No. 223,068

5 Claims. (Cl. 303—14)

This invention relates to fluid pressure brake equipment and more particularly to the type for use on railway locomotives.

When operating two or more locomotive units together, it is desirable to be able to control application and release of the brakes on all of the units by the independent brake valve device on the leading one of the units and it is also desirable in case one or more of the locomotive units breaks away from the other or others and connected cars of a train to ensure an emergency application of brakes on the unit or units broken away, and the principal object of the invention is the provision of improved means for accomplishing this result.

Other objects and advantages will become apparent from the following more detailed description of the invention.

In the accompanying drawing; Fig. 1 is a diagrammatic view of a brake equipment embodying the invention for one unit of a locomotive; and Figs. 2 and 3 are a diagrammatic view of a portion of an engineer's independent brake valve device shown in Fig. 1 but with the rotary valve in different positions.

Description

The invention is associated, for the purpose of illustration, with a locomotive brake equipment of the well-known EL type which, as shown in the drawing, may comprise for each locomotive unit the usual distributing valve device 1, engineer's automatic and independent brake valve devices 2, 3, respectively, brake cylinder device 4, main reservoirs 5 and 6 connected by a pipe 7 in which there is disposed a check valve 8 for permitting flow of fluid only in the direction from reservoir 5 to reservoir 6. The reservoir 5 is adapted to receive via pipe 9 fluid under pressure from an air compressor (not shown), while fluid under pressure from reservoir 6 is adapted to be constantly supplied via pipe 10 to an automatic brake valve device 2 and a supply valve chamber 11 in the distributing valve device 1.

The brake equipment further comprises the usual brake pipe 12 connected to the distributing valve device 1 and via a double heading cock 13 to the automatic brake valve device 2, a main reservoir equalizing pipe 14 open through a choke 15 to pipe 7 at the side of check valve 8 to which main reservoir 5 is connected, and an application equalizing pipe 16. The pipes 12, 14 and 16 extend to opposite ends of the locomotive unit for connection via the usual angle cocks 17, flexible hose 18 and couplings 19, respectively, to corresponding pipes on other units of the locomotive; the brake pipe 12 being adapted to also be connected to the brake pipe on a train. The pipes 14 and 16 extend only through the locomotive units. It will be assumed that the left-hand end of the pipes 12, 14 and 16 are at the leading end of the front locomotive unit, hence the cocks 17 at this end will be closed while the cocks 17 at the opposite end will be open.

The distributing valve device 1 is of usual structure comprising a casing containing an equalizing piston 20 at one side of which is a chamber 45 open to brake pipe 2 while at the opposite side is a valve chamber 21 connected to the usual pressure chamber 22. Contained in valve chamber 21 is a main slide valve 23 mounted between spaced apart shoulders 24 on a stem 25 projecting from piston 20, while an auxiliary slide valve 26 mounted on said main slide valve is disposed in a recess in said stem for movement therewith.

The distributing valve device further comprises an application piston 27, an application valve 28 and a release slide valve 29 operative by said piston, said application valve being contained in chamber 11. The release valve 29 is contained in a chamber 30 open via passage 31 to the right-hand face of the application piston 27 and to a pipe 32 connected to the brake cylinder device 4. At the left-hand face of piston 27 is a chamber 33 open through a passage 34 to the seat of the main equalizing slide valve 24 and also to an application pipe 35.

The automatic brake valve device 2 is of usual construction comprising a handle 36 movable to the usual release, running, lap, service and emergency positions. As well-known, in the release and running positions, fluid under pressure is adapted to be supplied to the brake pipe 12 for charging the brake pipe 12 and thereby the brake system on a locomotive unit or units and cars of a connected train. In service position of handle 36 pressure of fluid in brake pipe 12 is adapted to be reduced at a service rate for effecting a service application of brakes on the locomotive and cars of a train, while in emergency position fluid under pressure is adapted to be vented from brake pipe 12 at an emergency rate to effect an emergency application of brakes. Handle 36 is adapted to be moved to lap position for limiting a reduction in brake pipe pressure effected in service position.

The independent brake valve device 3 comprises a handle 37 adapted to turn a rotary valve 38 to various well-known positions including a running position (Fig. 1) to provide for release via a distributing valve release pipe 39 of an automatic application of brakes on the locomotive effected by operation of the automatic brake valve device 2, an application position (Fig. 3) and an independent release position (Fig. 2) for controlling application and release, respectively, of locomotive brakes through the application pipe 35 independently of the brake pipe and hence independently of brakes on cars of a connected train. The release pipe 39 connects the independent brake valve device to the seat of the main equalizing slide valve 24 in the distributing valve device. The rotary valve 38 is contained in a chamber 38a adapted to be constantly supplied with fluid under pressure, as well-known.

The double heading cock 13 comprises a casing containing a plug valve 40, and a handle 41 is connected to said valve for turning it to an open position, in which it is shown in the drawing, which is employed at the control end of the locomotive unit or units for opening the brake pipe 12 to the automatic brake valve device 2 via a passageway 42 in said valve. The handle 41 is movable to a closed position, indicated by a dash line 43, for operating the valve 40 to close communication between the brake pipe 12 and the automatic brake valve device 2. The handle 41 and valve 42 are adapted to be in open position only at the controlling automatic brake valve device, and on trailing locomotive units said handle and valve will be in closed position.

Now assuming that the main reservoirs 5, 6 are charged with fluid under pressure, and that at the leading end of the locomotive the double heading cock 13 is in open position and the automatic brake valve device handle 36 is in running position, the brake pipe 12 will be charged with fluid under pressure. On each unit of the locomotive, fluid under pressure from the brake pipe 12 will flow to piston chamber 45 in the distributing valve device and move the piston 20 and slide valves 26, 23 to brake release position in which they are shown in the drawing, if not already so positioned, and thence through a feed groove 46 to valve chamber 21 and pressure chamber 22 charging said chambers with fluid at the pressure in the brake pipe. With the slide valve 23 in release position the application chamber 33 will be vented via passage 34, a passage 47 in said slide valve, the release pipe 39, a cavity 48 in rotary valve 38 of the independent brake valve device 3, with the handle 37 in running position, in which it is shown in the drawing, and thence through a passage 49 extending through the automatic brake valve device 2, as well-known. With chamber 33 thus vented the application piston 27 and release slide valve 29 will assume the position in which they are shown in the drawing opening valve chamber 30 to an atmospheric exhaust passage 50 whereby the brake cylinder device 4 will be vented via pipe 32, passage 31 and valve chamber 30. With the parts positioned as just described, the application valve 28 will be closed by a spring 51.

If the automatic brake valve device 2 is now operated to service position to effect a reduction in pressure in brake pipe 12, the equalizing piston 20 will respond to such reduction and move the slide valves 26, 23 to the usual service position in which port 47 is disconnected from passage 34 and a port 52 is opened to valve chamber 21 and to passage 34, whereupon fluid under pressure from valve chamber 21 and pressure chamber 22 will flow to the application piston chamber 33. In case the brake valve handle 36 is moved to emergency position, an emergency reduction in pressure will occur in brake pipe 12 and the equalizing piston 20 will move to emergency position in which the left-hand end of slide valve 23 will move to the right-hand side of passage 34 to permit fluid under pressure to flow from valve chamber 21 and pressure chamber 22 to the application piston chamber 33. In both cases the fluid under pressure obtained in chamber 33 will operate piston 27 to first shift the slide valve 29 to lap the vent passage 50 and to then open the supply valve 28 whereupon fluid under pressure from the main reservoir 6 will flow to valve chamber 30 and thence to the brake cylinder device 4 to cause operation thereof to apply the locomotive brakes. Upon restoring pressure of fluid in the brake pipe 12 by operation of the automatic brake valve device 2, the equalizing piston 20 will return slide valves 26, 23 to brake release position in which fluid under pressure will be vented from the application piston chamber 33, as above described. Brake cylinder pressure acting on the right-hand face of piston 27 will then move it back to its release position for correspondingly positioning the release slide valve 29 to vent fluid under pressure from the brake cylinder device 4 to release the brakes.

With the brake pipe 12 fully charged with fluid under pressure and the brakes released, an application of brakes on the leading unit of the locomotive may be effected by turning the independent brake valve handle 37 and rotary valve 38 to application position (Fig. 3) in which fluid under pressure will flow from the rotary valve chamber 38a through a port 54 in said rotary valve to the application pipe 35 and thence through passage 34 in the distributing valve device to the application piston chamber 33. The application piston 27 will thereby be operated to apply the lomomotive brakes the same as before described. To release such, a brake application with the equalizing piston 20 and slide valve 23 of the distributing valve device in release position, the independent brake valve handle 37 and rotary valve 38 need only be returned to running position (Fig. 1) whereupon fluid under pressure will be released from the application piston chamber 33 via passage 47 in the equalizing main slide valve 23, the release pipe 39, cavity 48 in said rotary valve and passage 49, as above described.

If after an automatic application has been effected, it is desired to release the brakes on the locomotive unit independently of the brake pipe 12 and hence without releasing the brakes on a train, the independent brake valve handle 37 and rotary valve 38 may be turned to the independent release position (Fig. 2) in which a cavity 55 in said valve opens the application pipe 35 to an atmospheric vent passage 56 whereupon fluid under pressure will be released directly from the application piston chamber 33. The application piston will then shift the release slide valve 29 to release position in which a release of fluid under pressure from the brake cylinder device 4 will occur. After having released the brakes on the locomotive unit, as just described, if it is desired to reapply the brakes, such may be accomplished by turning the independent brake valve handle 37 and rotary valve 38 to application position (Fig. 3) whereupon such will occur.

In order that the brakes on all units of the locomotive will apply and release in synchronism with those on the leading unit, as just described, and to also ensure an application of brakes on a unit or units which may break away from a train, I add to the brake equipment, according to the invention, a valve device 58 and a double check valve device 59.

The valve device 58 comprises a check valve 60 contained in a chamber 61 open to a pipe 62 leading to one end of the double check valve device 59, a spring 63 in said chamber acting on said valve for urging it to a seated position. The valve 60 is provided on one end of a stem 64 slidably mounted in a bore in the casing, said stem being provided with an annular groove 65 under said valve and which is open to the application pipe 35, it being noted that said valve controls communication between pipes 35 and 62. A passageway 66 open at end to chamber 61 extends axially through the valve 60 and stem 64 and opens at its opposite end to a chamber 67 through a valve seat provided on said stem around said passageway for engagement by a valve 68 contained in chamber 67 which is open to the brake cylinder pipe 32.

The valve 68 is connected to one end of a stem 69 for movement therewith, said stem extending through an opening in a partition wall 70 into a chamber 71 which is open to atmosphere via vent 72. The end of stem 69 in chamber 71 terminates in a follower head 73 engaging one side of a flexible diaphragm 74 at the opposite side of which is a pressure chamber 75. A spring 76 in chamber 71 urges the head 73 and diaphragm 74 to the position in which they are shown in the drawing.

Diaphragm chamber 75 is adapted to be vented on the lead unit of a locomotive and to be supplied with fluid under pressure on all other units, and this may be done conveniently by the double heading cock 13. Accordingly, chamber 75 is connected by a pipe 77 to the double heading cock 13, the plug 40 of which is provided with a cavity 78 arranged to open pipe 77 and diaphragm chamber 75 to atmosphere via a vent 79 in the position of said cock in which it opens brake pipe 12 to the automatic brake valve device 2 (Fig. 1), and to open pipe 77 via cavity 78 to the main reservoir equalizing pipe 14 in its other position. Consequently, on the lead unit of a locomotive, diaphragm chamber 75 will be vented while on all trailing units said chamber will be supplied with fluid under pressure from the main reservoir equalizing pipe 14.

With diaphragm chamber 75 vented on the lead unit of the locomotive, spring 76 will urge the diaphragm 74 and valve 68 to the position in which they are shown in the drawing, while spring 63 will seat valve 60. With diaphragm chamber 75 charged with fluid under pressure on all locomotive units except the lead unit, the valve 68 will be seated and valve 60 open connecting pipe 35 to pipe 62.

The double check valve device 59 comprises a casing having two chambers 80, 81 open, respectively, to pipe 62 and the main reservoir equalizing pipe 14. The chambers 80, 81 are separated by a partition wall 82 having a through bore open between its ends to the application equalizing pipe 16 and on opposite sides of said wall there are oppositely arranged valve seats encircling the respective ends of said bore for contact with check valves 83, 84, respectively. The check valves 83, 84 are contained, respectively, in chambers 80, 81 and connected to each other by a stem 85 extending through the bore above mentioned, said stem being of such length that one of said valves will be open when the other is closed.

With the main reservoir equalizing pipe 14 extending through the several units of the locomotive charged with fluid under pressure from the main reservoir 5, such pressure acting in chamber 81 of the double check valve device 59 will seat the check valve 84 and unseat the check valve 83 thereby opening the application equalizing pipe 16 to valve chamber 61 in the valve device 58 on each of the locomotive units. On the lead locomotive unit where the double heading cock 13 is in the position venting chamber 75 of the respective valve device 58 the application equalizing pipe 16 will be opened past the open valve 68 to the brake cylinder pipe 32, while on the trailing units where diaphragm chamber 75 of the respective valve devices 58 is supplied with fluid under pressure, the application pipe 35 will be open past the respective unseated valve 60 to the equalizing pipe 16.

Therefore, when the independent brake valve device 3 on the lead locomotive unit is operated to supply fluid under pressure to the application pipe 35 to cause supply of fluid under pressure to the respective brake cylinder device 4 to apply brakes on the respective locomotive unit, fluid at the pressure obtained in said brake cylinder device will become effective through the respective valve device 58 in the equalizing pipe 16 back through the locomotive. On each locomotive unit to the rear of the lead unit, fluid under pressure from the equalizing pipe 16 will flow, respectively, through the double check valve device 59 and valve device 58 to the application pipe 35 and thence to the application piston chamber 33 to cause an application of brakes on the respective unit of the same degree as acting on the lead unit. Conversely, upon release of brakes on the leading unit by operation of the independent brake valve device, the pressure in the equalizing pipe 16 and application piston chamber 33 on the trailing units will reduce as the pressure in the brake cylinder device 4 on the lead unit reduces whereby a release of brakes on all units of the locomotive will occur.

Thus merely by the addition of the valve device 58 to each unit of a locomotive positioned as in accordance with the position of the double heading cock 13 on the respective unit, independent control of brakes on all units is provided for from the independent brake valve device on the lead unit, the pipe 62 on each unit being constantly open to the application equalizing pipe 16 under such condition.

In case of one or more of the locomotive units breaking away from the remainder of the train, fluid under pressure will be suddenly vented from the brake pipe 12, the main reservoir equalizing pipe 14 and the application equalizing pipe 16. In response to the sudden reduction in pressure in the brake pipe 12, the equalizing piston 20 of the distributing valve device on the unit or units broken away will operate the slide valve 23 to supply fluid under pressure to passage 34, and the application pipe 35 and piston chamber 33 to cause operation of the application piston 27 to supply fluid under pressure to the respective brake cylinder device 4 to apply the brakes of the respective unit. As fluid under pressure is thus supplied to the application pipe on each locomotive unit, it will flow to the independent brake valve device 3 where it will be blocked against further flow by rotary valve 38, and it will also flow to the annular groove 65 in the valve device 58. On the lead unit the parts of the valve device 58 will be in the position in which they are shown in the drawing with the valve 60 seated to prevent flow of fluid under pressure from the application pipe 35 to pipe 62 but the valve 68 will be open which will permit flow of fluid under pressure from the brake cylinder device 4 to pipe 62 and thence to chamber 80 in the double check valve device 59. Due to choke 15 limiting flow of fluid under pressure from the main reservoir 5 to the main reservoir equalizing pipe 14, pressure of fluid in chamber 81 of the double check valve device will be suddenly dissipated upon venting of the pipe 14, so that the fluid under pressure supplied from the brake cylinder device 4 to chamber 80 and acting therein on check valve 83 will shift said check valve into contact with its seat to prevent dissipation of the fluid under pressure supplied to the brake cylinder device 4 thereby ensuring braking and stopping of the locomotive unit.

If more than the lead unit breaks away, the brakes on the lead unit will be positively applied as just described. On any following unit or units still connected to the lead unit and on which chamber 75 in the respective valve device or devices is open to the main reservoir equalizing pipe 14 through the double heading cock 13 in the brake pipe closing position thereof, the sudden venting of fluid under pressure from said pipe will result in a like venting of fluid under pressure from chamber 75 due to which the parts of the respective valve device 58 will move to the same position as they occupy on the lead unit, in consequence of which braking of the respective unit or units is ensured the same as on the lead unit.

Summary

It will now be seen that by the addition to each locomotive unit of the valve device 58 controlled as through the double heading cock 13, an engineer is enabled to control the application and release of brakes on all units of the locomotive by the independent brake valve device, while providing each unit with the double check valve device 59 will ensure an application of brakes on each unit or units of the locomotive in case of break-away from a train.

Having now described my invention, what I claim as new and desire to secure by Letters Patent, is:

1. In a fluid pressure brake equipment for a locomotive unit, the combination with brake means operable by fluid under pressure to effect an application of brakes and upon release of fluid under pressure a release of brakes, application means operable by fluid under pressure to supply fluid under pressure to said brake means and upon release of fluid under pressure to release fluid under pressure from said brake means, an engineer's brake valve device for either supplying fluid under pressure to or venting fluid under pressure from said application means and an application pipe constituting an always open communication between said brake valve device and said application means for the flow of such fluid under pressure therebetween, of an application equalizing pipe adapted to extend from end to end of the locomotive unit for connection with a corresponding pipe on another locomotive unit, a valve device having one position for opening said application equalizing pipe to said application pipe and having another position for opening said application equalizing pipe to said brake means for equalizing pressure of fluid in said brake means into said equalizing pipe, and an engineer's double heading cock for controlling positioning of said valve device.

2. In a fluid pressure brake equipment for a locomotive unit, the combination with brake means operable by fluid under pressure to effect an application of brakes and upon release of fluid under pressure a release of brakes, application means operable by fluid under pressure to supply fluid under pressure to said brake means and upon release of fluid under pressure to release fluid under pressure from said brake means, an application pipe, and an engineer's brake valve device capable at all times of either supplying fluid under pressure to or venting fluid under pressure from said application means by way of said application pipe, of an application equalizing pipe and a normally charged fluid pressure supply pipe both adapted to extend from end to end of the locomotive unit for connection with corresponding pipes on another locomotive unit, a valve device operable by fluid under pressure to open said equalizing pipe to said application pipe and upon release of fluid under pressure to open said equalizing pipe to said brake means to receive fluid under pressure from said brake means, manually operable means for selectively supplying fluid under pressure to or releasing fluid under pressure from said valve device for controlling operation thereof, and valve means controlling communication between said brake means and equalizing pipe in series with the control by said valve device and operable by fluid under pressure from said supply pipe to open such communication and upon venting of fluid under pressure from said supply pipe to close such communication.

3. In a fluid pressure brake equipment for a locomotive unit, the combination with brake means operable by fluid under pressure to effect an application of brakes and upon release of fluid under pressure to effect a release of brakes, a brake cylinder pipe connected to said brake means, application means operable by fluid under pressure to supply fluid under pressure to said brake means via said brake cylinder pipe and operable upon release of fluid under pressure to vent fluid under pressure from said brake means via said brake cylinder pipe, an engineer's brake valve device for supplying fluid under pressure to and releasing fluid under pressure from said application means, an application pipe connected at opposite ends to said brake valve device and application means for conveying fluid under pressure therebetween, an equalizing pipe adapted to extend from end to end of the locomotive unit for connection with a corresponding pipe on another locomotive unit, a first valve controlling a communication between said equalizing pipe and said application pipe, a second valve controlling a communication between said equalizing pipe and said brake cylinder pipe, movable abutment means operable by fluid under pressure to actuate said valves to disconnect said equalizing pipe from said brake cylinder pipe and open it to said application pipe, spring means for actuating said abutment means and valves upon release of fluid under pressure on said abutment means to close communication between said application pipe and equalizing pipe and to open the latter to said brake cylinder pipe, and manually operable means for either supplying fluid under pressure to act on said abutment means or for releasing fluid under pressure from said abutment means.

4. In a fluid pressure brake equipment for a locomotive unit, the combination with a brake pipe, an application equalizing pipe and a fluid pressure supply pipe extending from end to end of the locomotive unit for connection with corresponding pipes on another locomotive unit, brake means operable by fluid under pressure to effect an application of locomotive brakes and upon release of fluid under pressure a release of locomotive brakes, a brake cylinder pipe for conveying fluid under pressure to and from said brake means, a distributing valve device comprising an application portion operable by fluid under pressure to supply fluid under pressure to said brake cylinder pipe and upon release of fluid under pressure to release fluid under pressure from said brake cylinder pipe, and an equalizing portion operable upon venting of fluid under pressure from said brake pipe to supply fluid under pressure to said application portion, an engineer's automatic brake valve device for varying pressure of fluid in said brake pipe, an engineer's independent brake valve device for supplying fluid under pressure to and releasing fluid under pressure from said application portion for controlling operation thereof, an application pipe for conveying such fluid under pressure between said brake valve device and application portion, a valve device operable by fluid under pressure to close a communication from said equalizing pipe to said brake cylinder pipe and to open said equalizing pipe to said application pipe and operable upon release of such fluid under pressure to close communication between said equalizing pipe and application pipe and open said equalizing pipe to said brake cylinder pipe, manually operable valve means for either supplying fluid under pressure to or releasing fluid under pressure from said valve device for controlling operation thereof, and a double check valve device controlling the communication between said valve device and equalizing pipe operable by fluid under pressure from said supply pipe to open such communication and upon venting of fluid under pressure from said supply pipe to close such communication.

5. In a fluid pressure brake equipment for a locomotive, in combination, brake means operable by fluid under pressure to effect an application of brakes and upon release of fluid under pressure to effect a release of brakes, application means operable by fluid under pressure to supply fluid under pressure to said brake means and upon release of fluid under pressure to release fluid under pressure from said brake means, an application pipe connected to said application means, an engineer's brake valve device connected to said application pipe for supplying and releasing fluid under pressure through said pipe to and from said application means, a fluid pressure supply pipe adapted to be constantly supplied with fluid under pressure and an equalizing pipe both of which are adapted to extend from end to end of a locomotive for connection with corresponding pipes on another locomotive in double heading of locomotives, valve means for either establishing communication between said brake means and said equalizing pipe or for closing said communication and opening said equalizing pipe to said application pipe, manually operable means for controlling said valve means, and means controlling said communication operable by fluid under pressure from said supply pipe to open such communication and upon venting of fluid under pressure from said supply pipe to close such communication.

References Cited in the file of this patent

UNITED STATES PATENTS 1,394,074    Farmer ---------------- Oct. 18, 1921